United States Patent
Jeng et al.

(10) Patent No.: US 6,886,009 B2
(45) Date of Patent: Apr. 26, 2005

(54) QUERY ROUTING BASED ON FEATURE LEARNING OF DATA SOURCES

(75) Inventors: Jun-Jang Jeng, Armonk, NY (US); Youssef Drissi, Ossining, NY (US); Moon Ju Kim, Wappingers Falls, NY (US); Lev Kozakov, Stamford, CT (US); Juan Leon-Rodriquez, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 10/209,112

(22) Filed: Jul. 31, 2002

(65) Prior Publication Data

US 2004/0024745 A1 Feb. 5, 2004

(51) Int. Cl.$^7$ ............................................... G06F 17/30
(52) U.S. Cl. ......................................................... 707/3
(58) Field of Search ............................. 707/1–10, 100, 707/3

(56) References Cited

U.S. PATENT DOCUMENTS

| | | | |
|---|---|---|---|
| 5,398,302 A | 3/1995 | Thrift | 706/25 |
| 5,499,366 A | 3/1996 | Rosenberg et al. | 707/4 |
| 5,737,734 A | 4/1998 | Schultz | 707/5 |
| 5,899,991 A | 5/1999 | Karch | 707/5 |
| 5,956,708 A | 9/1999 | Dyko et al. | 707/3 |
| 6,041,326 A | 3/2000 | Amro et al. | 707/10 |
| 6,085,186 A | 7/2000 | Christianson et al. | 707/3 |
| 6,102,969 A | 8/2000 | Christianson et al. | 717/8 |

(Continued)

FOREIGN PATENT DOCUMENTS

EP 851368 A2 12/1997 .......... G06F/17/30

OTHER PUBLICATIONS

Victor Holmes et al., Integrating Metadata tools with the data services archive to provide web–based managment of large–scale scientific simulation, 2004, IEEE Computer Soc., pp. 72–79.*

(Continued)

Primary Examiner—Diane D. Mizrahi
(74) Attorney, Agent, or Firm—Louis Herzberg (57) ABSTRACT

Query routing is based on identifying the preeminent search systems and data sources for each of a number of information domains. This involves assigning a weight to each search system or data source for each of the information domains. The greater the weight, the more preeminent a search system or data source is in a particular information domain. These weights $W_i\{1=0, 1, 2, \ldots N]$ are computed through a recursive learning process employing meta processing. The meta learning process involves simultaneous interrogation of multiple search systems to take advantage of the cross correlation between the search systems and data sources. In this way, assigning a weight to a search system takes into consideration results obtained about other search systems so that the assigned weights reflect the relative strengths of each of the systems or sources in a particular information domain. In the present process, a domain dataset used as an input to query generator. The query generator extracts keywords randomly from the domain dataset. Sets of the extracted keywords constitute a domain specific search query. The query is submitted to the multiple search systems or sources to be evaluated. Initially, a random average weight is assigned to each search system or source. Then, the meta learning process recursively evaluates the search results and feeds back a weight correction $dW_i$ to be applied to each system or source server by using weight difference calculator. After a certain number of iterations, the weights $W_i$ reach stable values. These stable values are the values assigned to the search system under evaluation. When searches are performed, the weights are used to determine search systems or sources that are interrogated.

14 Claims, 7 Drawing Sheets

U.S. PATENT DOCUMENTS

| | | | |
|---|---|---|---|
| 6,240,412 B1 | 5/2001 | Dyko et al. | 707/5 |
| 6,778,979 B2 * | 8/2004 | Grefenstette et al. | 707/3 |
| 6,829,599 B2 * | 12/2004 | Chidlovskii | 707/3 |
| 2002/0156792 A1 * | 10/2002 | Gombocz et al. | 707/100 |
| 2004/0024745 A1 * | 2/2004 | Jeng et al. | 707/2 |
| 2004/0068486 A1 * | 4/2004 | Chidlovskii | 707/3 |

OTHER PUBLICATIONS

Wai Lam et al., A meta–learning approach for text categorization, 2001, ACM Press, pp. 303–309.*

Stefan Siersdorfer, Restrictive clustering and metaclustering for self–organization document collections, 2004, ACM Press, pp. 226–233.*

Mark Stephenson et al., Meta optimization: improving compiler heuristics with machine learning, 2003, ACM Press, pp. 77–90.*

Ricardo Vilalta & Youssef Drissi, "A Perspective Vision & Survey of Meta–Learning"; Metal tex 2002 Kluwer Acad. Pub. pp 1 to 21.

* cited by examiner

QUERY ROUTING BASED ON FEATURE LEARNING OF DATA SOURCES

RELATED APPLICATIONS

U.S. patent application Ser. No. 10/209,619 filed Jul. 31, 2004 herewith and entitled "Optimization of Server Selection Using Euclidean Analysis of Search Terms", the disclosure of which application is hereby incorporated by reference.

FIELD OF THE INVENTION

The present invention relates to performing database searches on network databases. More particularly, the present invention relates to selection of servers to be interrogated by the search terms.

BACKGROUND OF THE INVENTION

Internet text retrieval systems accept a statement of requested information in terms of a search query $S_s$ made up of a plurality of keywords $T_1, T_2, \ldots T_i, \ldots T_n$ and return a list of documents ranked in order of how well the documents match the search query. The need to search the databases has resulted in development of search engines that provide a query interface to the information containing sources and return search results ranked sequentially to direct search processing of the databases. However, the use of these search engines has not resulted in completely acceptable results. The search engines process search interrogations in different ways and as a result the same query will result in different results from the different engines. Further, with the expansion of the world wide web, databases and search engines available for search have multiplied to the extent that the amount of data available to users has increased dramatically. The result is an information overload for the user. It has been found that when general purpose search engines are used in searching voluminous, imprecise, and varying results are obtained. When topic specific engines are used, the searchers judgment in selecting the appropriate search engines and the search engine providers biases relative to the information provided introduce search errors.

Because of the above and other considerations, obtaining accurate results from searches for information on the Internet can be very time consuming for a searcher attempting to search all apparently relative sources. Moreover, the information processing resources and man hours necessary to support such searching can be expensive and may diminish interest in searching the Internet. What is needed to overcome information overload in a distributed information system, such as the Internet, is an automated system and method of information retrieval which optimally selects sources or databases most likely to provide the best response to a user. A number of ways have been suggested to select those search engines that will provide the most accurate search. However, these past suggestions have not resulted in completely acceptable results.

Therefore it is an object of the present invention to provide an improved query routing system.

It is further an object of the present invention to provide a query routing system based on previous search results using one or more search terms in the query.

Further, an object of the present invention is to limit search interrogations to servers providing best results in previous searches using one or more of the search terms.

BRIEF DESCRIPTION OF THE INVENTION

In accordance with the present invention, query routing is based on identifying the preeminent search systems and data sources for each of a number of information domains. This involves assigning a weight to each search system or data source for each of the information domains. The greater the weight, the more preeminent a search system or data source is in a particular information domain. These weights $W_i \{ 1 = 0, 1, 2, \ldots N \}$ are computed through a recursive learning process employing meta processing. The meta learning process involves simultaneous interrogation of multiple search systems to take advantage of the cross correlation between the search systems and data sources. In this way, assigning a weight to a search system takes into consideration results obtained about other search systems so that the assigned weights reflect the relative strengths of each of the systems or sources in a particular information domain. In the present process, a domain dataset used as an input to query generator. The query generator extracts keywords randomly from the domain dataset. Sets of the extracted keywords constitute a domain specific search query. The query is submitted to the multiple search systems or sources to be evaluated. Initially, a random average weight is assigned to each search system or source. Then, the meta learning process recursively evaluates the search results and feeds back a weight correction $dW_i$ to be applied to each system or source server by using weight difference calculator. After a certain number of iterations, the weights $W_i$ reach stable values. These stable values are the values assigned to the search system under evaluation. When searches are performed, the weights are used to determine search systems or sources that are interrogated.

DETAILED DESCRIPTION OF THE INVENTION

Figure 1:
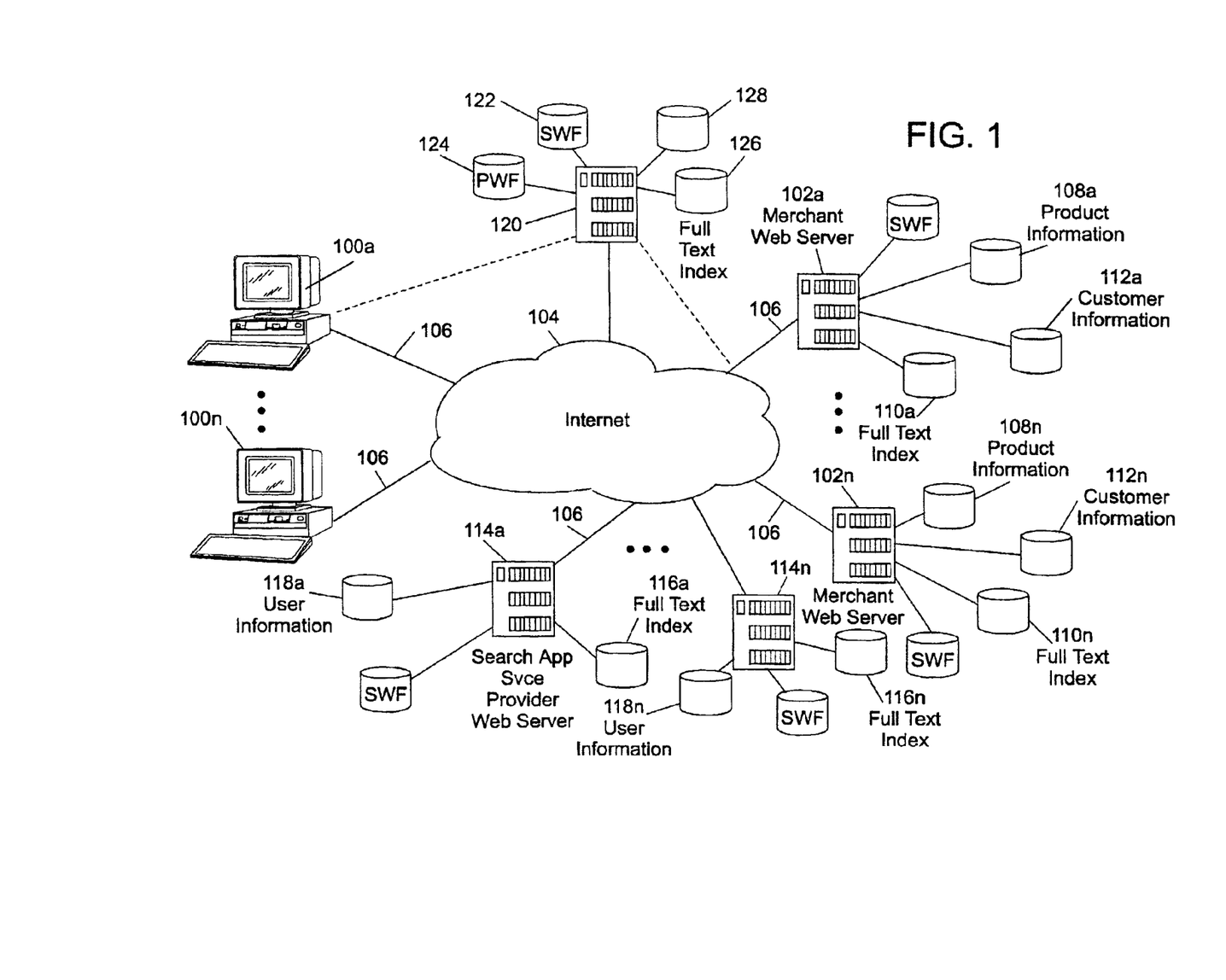
FIG. 1 is system organization for an on-line area network.

Referring now to FIG. 1, communication between a plurality of user computers $100a$ to n and a plurality of information servers $102a$ to $102n$ is accomplished via an on-line service through a wide area network such as the Internet 104 that includes network node servers. The network node servers manage network traffic such as the communications between any given user's computer and information server.

The computers 100 are equipped with communications software, including a WWW browser such as the Netscape browser of Netscape Communications Corporation, that allows a shopper to connect and use on-line shopping services via the Internet. The software on a user's computer 100 manages the display of information received from the servers to the user and communicates the user's actions back to the appropriate information servers 102 so that additional display information may be presented to the user or the information acted on. The connections 106 to the network nodes of the Internet may be established via a modem or other means such as a cable connection.

The servers illustrated in FIG. 1, and discussed hereafter, are those of merchants. While the following discussion is directed at communication between shoppers and merchants over the Internet it is applicable to any information seeker and any information provider on a network. (For instance, the information provider can be a library such as a University library, the public library or the Library of Congress or other type of information providers.) Information regarding a merchant and the merchant's products is stored in a shopping database 108 to which the merchants servers 102 have access. This may be the merchants own database or a database of a supplier of the merchant. All product information accessible by the merchant servers that is publishable as web pages is indexed and a full-text index database 110 which records the number of occurrences of each of the words and their use in the location. In addition to the servers of individual merchants, and other information providers, there are the servers 114a to 114 of plurality of search service providers, such as Google of Google, Inc., which maintain full text indexes 116 of the products of the individual merchants 102a to 102n obtained by interrogating the product information databases 108 of the individual merchants. Some of these search service providers, like Google, general purpose search providers while others are topic specific search providers.

An information consolidator 120 is provided. An information consolidator obtains information from various ones of the merchant servers 102 and those of the search application service providers 114 and supplies it to a user. The information consolidator may be an independent source for data, or as shown by the dotted lines, associated with a merchant 102a or be the user 100a obtaining the data.

The information consolidator provides added value by modification of the data it receives from its sources. The ranking of data provided by the merchant or search application service provider varies from the ranking that would be provided by the raw ranking elements in the data either to be helpful to the user or to reflect the interests or biases of the data provider. For instance, the merchants and the search application service providers each may maintain a database of information about shoppers and their buying habits to customize on-line shopping for the shopper. Operations to accomplish a customized electronic shopping environment for the shopper include accumulating data regarding the shopper's preferences. Data relating to the electronic shopping options, such as specific sites and specific products selected by the shopper, entry and exit times for the sites, number of visits to the sites, etc., are recorded and processed by each merchant to create a shopping profile for the shopper. Raw data may then be analyzed to create a preference profile for the shopper. The profile may also include personal data or characteristics (e.g. age, address, hobbies) regarding the shopper as provided by the shopper when subscribing to the service. The data accumulation on the shoppers are placed in the shoppers profile database 112 or 118 of each of the merchants. Each individual shopper's profile in the databases of the merchants and the search application service providers can differ from one to another based on the particular merchant's or service providers experience with the shopper and their profiling software. Data collection may continue during searches made by the shopper so that up-to-date profile data for the shopper is obtained and used.

With information regarding the shopper involved in the shopping transaction, the merchant is able to meet the needs of the shopper, and the shopper is presented with the opportunity to view and purchase that merchandise that is most likely to be of interest since the merchant's products and services are directed toward those shoppers who have, either directly or indirectly, expressed an interest in them.

When the search characteristics in the form for key words are entered by the shopper into the apace provided on the default or home page of his/her browser, the search engine of the merchant web server 102 does a search of the accessed full text index database 110 or 118 using the key words and gets a list of documents describing those products and services that contain matches to the key words. This list of documents contain basic test ranking data (including the number of hits, their location, etc. which are used to order the list of documents) with documents with higher scores at the top. This list is then sent to the ranking module which will apply a ranking algorithm to rank the list of documents using the text factors and other rank factors, such as link analysis, popularity, the user's preferences from profile, etc. and return a reordered list of documents, with documents with higher scores at the top by providing each of the articles with a Rank Factors Score. This Rank Factom Score can also contain factors which promote the interests of the information provider or effect his biases.

Figure 2:
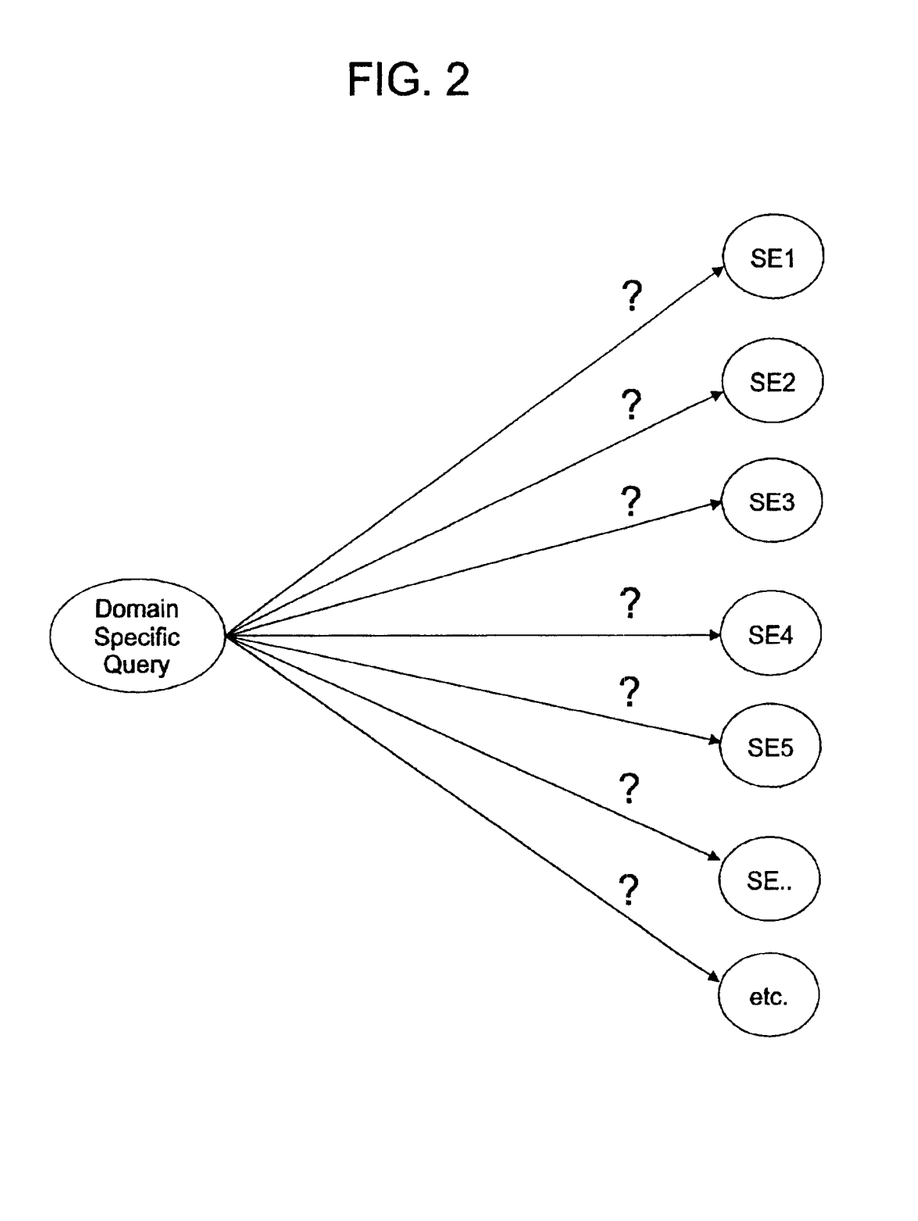
FIG. 2 is a diagram that shows interrogation of all the servers shown in FIG. 1.
Figure 3:
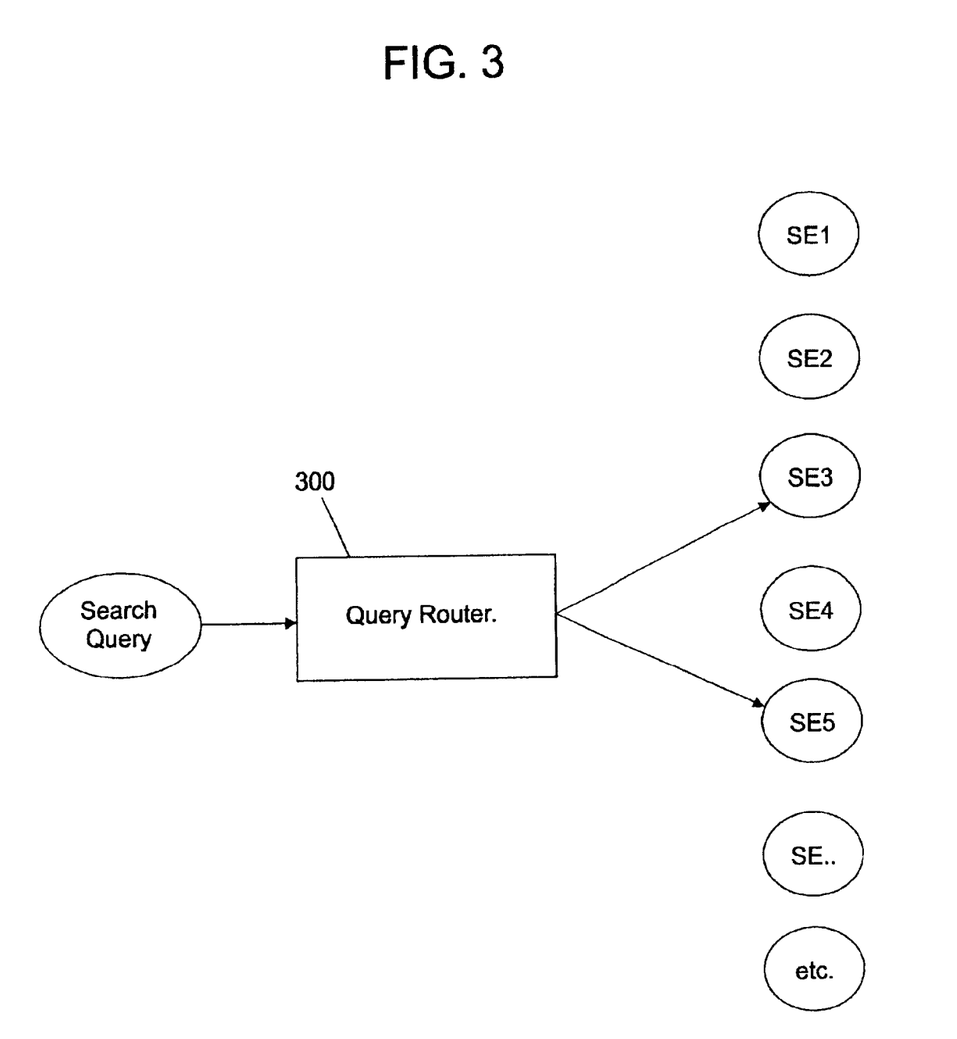
FIG. 3 is a diagram that shows selection of a limited number of servers.

Referring now to FIG. 2, it shows the servers SE1 through SEn each being interrogated by search engine based on a search query introduced into a computer resulting in the above mentioned problems associated with information overload. As pointed out above, it has been found that when general purpose search engines are used in the searching of the worldwide web, voluminous and imprecise results can be obtained. Topic specific search engines could provide more precise search results. However, the biases of the search source provider and the ability of the searcher to select the proper topic specific search engines affects the ability to obtain desirable results. Further, all search results can be affected by the result modification techniques mentioned in connection with FIG. 1. In accordance with the present invention, selection of the most pertinent search sources is provided based on the use of meta processing. FIG. 3 shows a query router 300 which is configured using meta processing to determine which search sources are to be interrogated. The sources selected will vary depending on the information domain interrogated by the keywords used in the query so that for one set of keyword sources SE3 and SE5 may be selected. However with other combinations of keywords, a different information domain can be involved and the sources selected may be the sources SE2 to SE4 or any other combination of the various sources SE1 to SEn.

The meta search engine is programmed to select sources based on data contained in an information domain. A domain dataset is used to define an information domain. For example, a domain dataset may contain information about semiconductor devices, another domain dataset may contain information about computers. Documents in domain datasets can overlap with certain documents appearing in multiple datasets. The subject matter contained in domain data sets can be determined in many ways and deal with any number of different subjects. One way is to define clusters as disclosed in copending application Ser. No. 10/209,619 filed Jul. 31, 2002. The documents falling within a cluster can then be used as a domain dataset in connection with the present invention. Any other ways of determining domain specific datasets can also be used.

Figure 4:
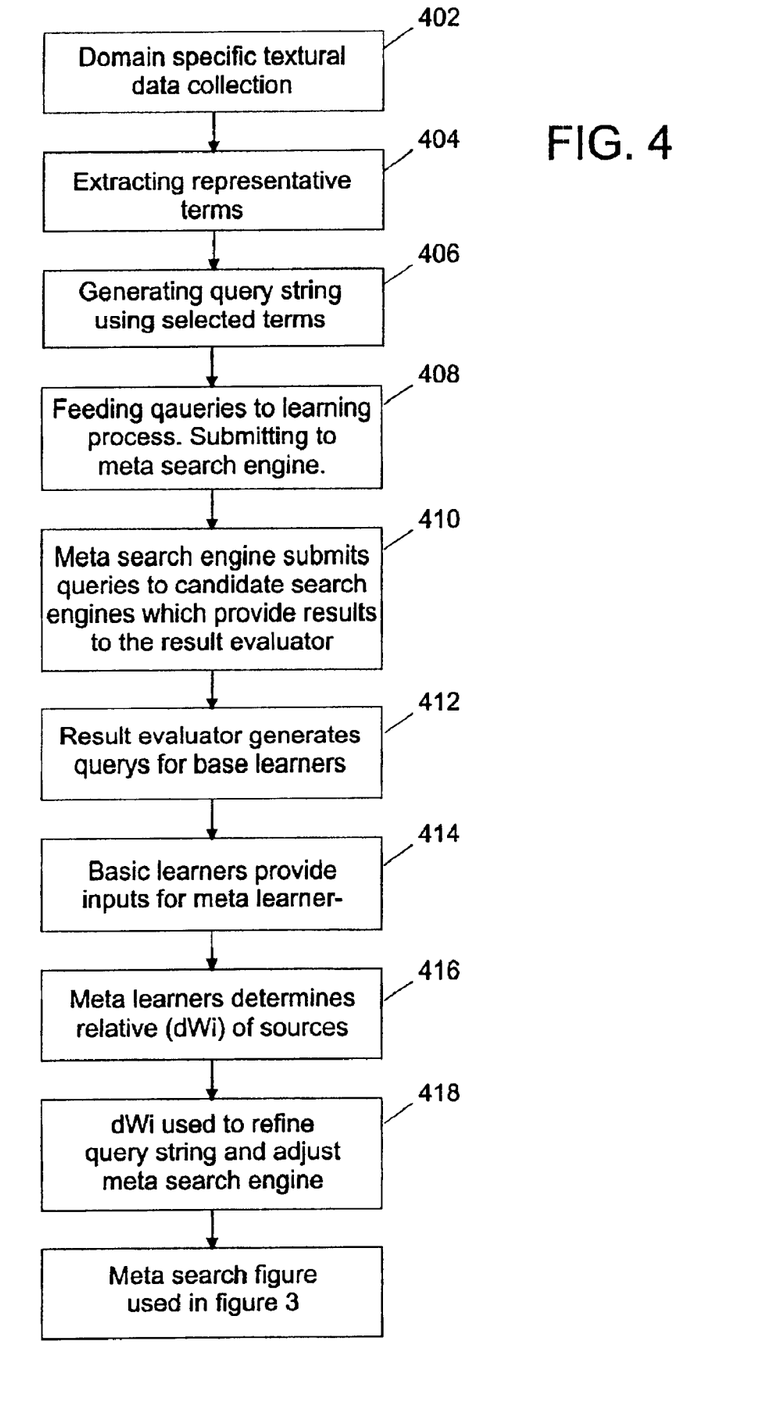
FIG. 4 is a flow diagram that shows how each query made to the network shown in FIG. 1 is defined in terms of a query space in in accordance with the present invention.
Figure 5:
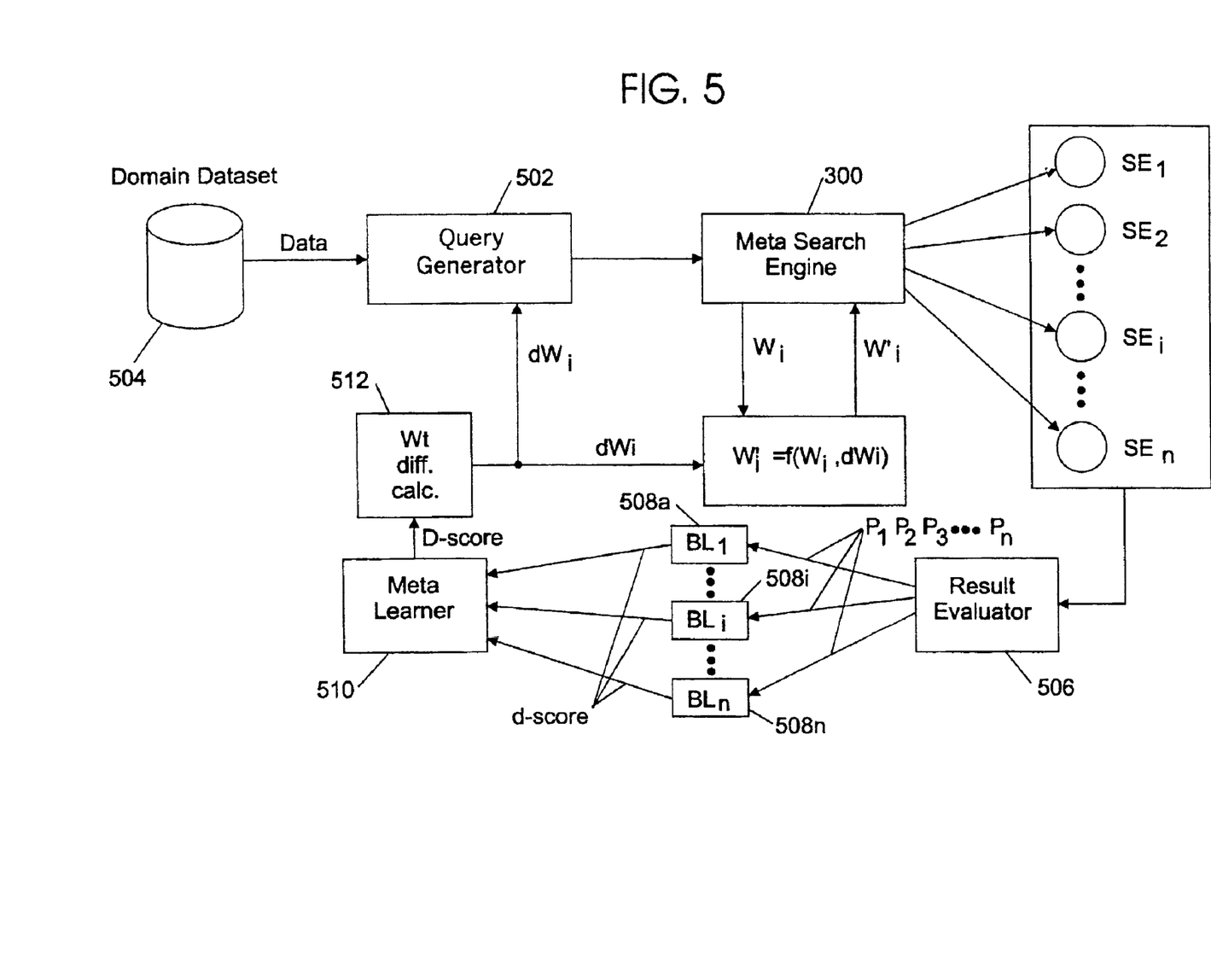
FIG. 5 is a system diagram for the flow process of FIG. 4.

As shown in FIGS. 4 and 5, during its programming the query router 300 provides queries generated by a query generator 502 from one of the domain data sets 504 to the search engine 300 of FIG. 3 (steps 402 to 408). Search engine 300 interrogates the various sources SE1 to SEn and provides results to a result evaluator 506 (step 410). For each query, the result evaluator 506 analyzes the documents obtained from the various search engines SE1 to SEn for pertinent search information and generates queries for basic learners (step 412). Such inputs $P_1$ can include the number of times the search terms appear in the document $P_1$, the proximity of the search terms to one another in the document $P_2$, and the type of document that the search terms appear in $P_3$. (For instance, whether the document is an ad appearing in the paper or technical paper.)

Figure 6:
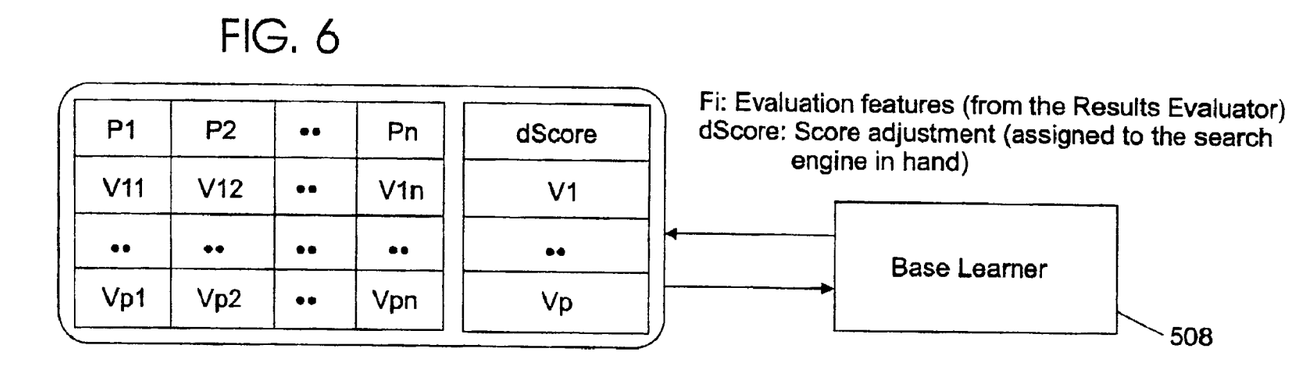
FIG. 6 is a block diagram of a basic learner of FIG. 5.

A base learner 508 contains an algorithm that takes the results $P_1, P_2, P_3, \ldots P_n$ provided by the evaluator 506 and makes decisions based on the results they receive. Referring to FIG. 6, the base learners are trained with training sets $V_{11} \ldots V_{1n}$ thru $V_{p1}$ to $V_{pn}$ of the evaluation features $P_1$ to $P_n$ and assigning a d-score $V_1$ to $V_p$ respectively for each set. The d-score reflects the relative ranking of a server providing a particular test $V_{1l}$ to $V_{1p}$ providing a particular set. Once a base learner has been configured using the training data during the phase one of the off-line process, it is used to take the evaluation features $P_1$ to $P_n$ given by the Result Evaluator module as input and give a relative score adjustment for a server as output for a particular query S. The problem with base learners is that they have a built in bias. That is, the algorithm used by a base learner predetermines results obtained from a base learner. To overcome the bias, multiple base learners each with a different algorithm configuration are used and the outputs of the base learners 508 are all fed to a meta learner 510 (step 414).

Figure 7:
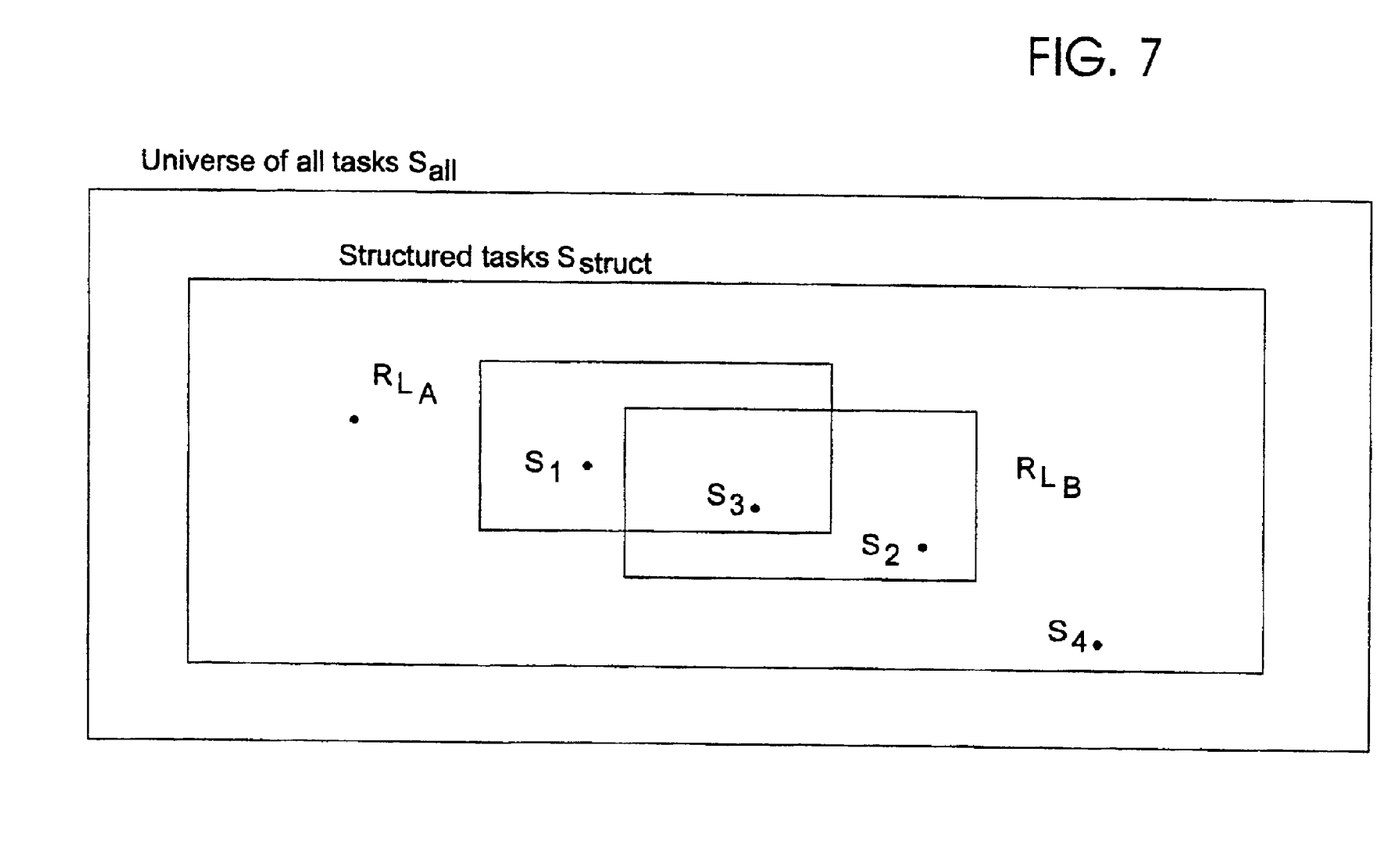
FIG. 7 is a diagram to show the effect of bias in base learners.

A meta learner is used to analyze various base learner outputs to overcome the built in bias of any one or more of the base learners. As shown in FIG. 7, the space of all tasks $S_{all}$ contains many random regions; failing to learn over those regions carries in fact no negative consequences. However, region $R_L$ comprises a subset of structured tasks, $S_{struct}$, where each task S is nonrandom and can be ascribed a low degree of complexity. Each task S may lie inside or outside the region that favors the bias embedded by a base learners learning algorithm L. In FIG. 7, task S1 is best learned by algorithm LA because it lies within the region $R_{LA}$. Similarly, $S_2$ is best learned by algorithm $L_B$, whereas $S_3$ is best learned by both $L_A$ and $L_B$. A solution to the meta-learning problem can indicate how to match learning algorithms with task properties, in this way yielding a principled approach to the dynamic selection of learning algorithms. In addition, meta-learning can solve the problem of learning tasks lying outside the scope of available learning algorithms. As shown in FIG. 7, task $S_4$ lies outside the regions of both $L_A$ and $L_B$. If $L_A$ and $L_B$ are the only available algorithms at hand, task $S_4$ is prone to receive a poor concept estimation. To solve this problem, meta-learner is used to combine the predictions of base-learners in order to shift the dominant region over the task under study. As for the task $S_4$, the meta-learner is embedded with a bias favoring a region of tasks that includes $S_4$.

Figure 8:
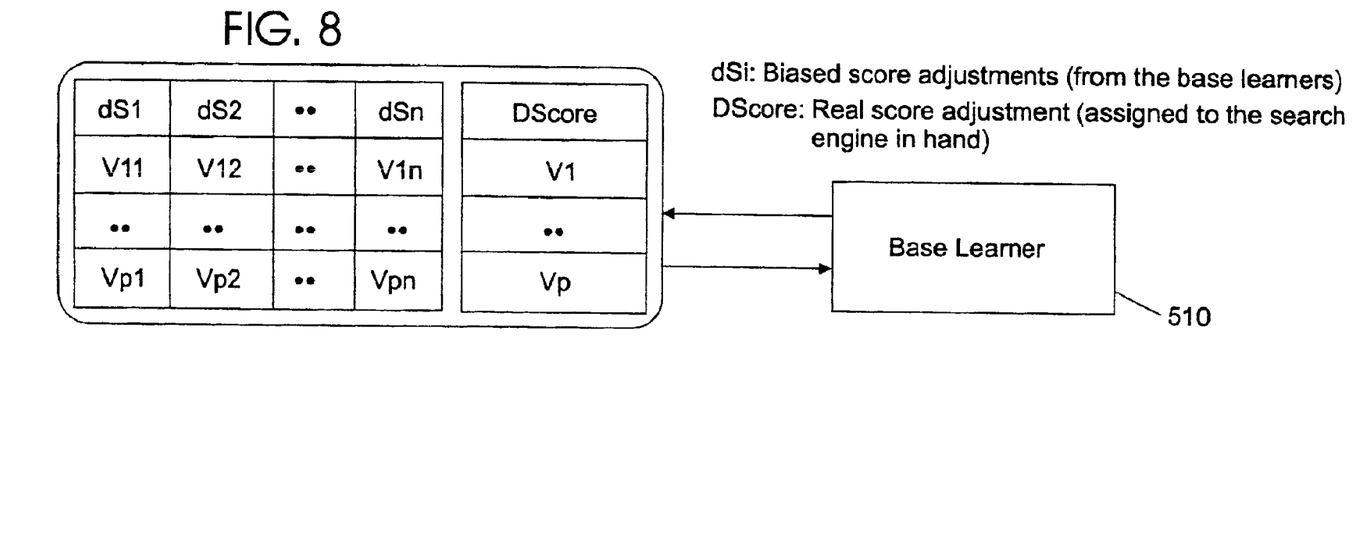
FIG. 8 is a block diagram of a meta learner combination of FIG. 5.

Referring to FIG. 8, the meta learners are trained with the outputs ds1 to dsn of the multiple base learners to take into account the biases involved in the base learners. Once the meta learner has been configured using the training data during the phase one of the off-line process, it is used to take biased score adjustments given by base learners modules as input and give a "final" score adjustment $V_1$ to $V_p$ for the response of a particular source $SE_2$ to a query S as output. The meta learner analyzes the results from each query from each of the base learners (step 416) and provides an output to a weight differential calculator based on the results obtained from the base learners. The weight differential calculator 512 then provides a relative weighting dWi, (say from 1 to N) for each of the sources SE1 to SEn for each query $S_1$. As a result, the weighting of the sources is relative to one another so that for any given domain the weight reflects the relative applicability to the particular queries of the various search engines for the domain data set. The output of the weight differential calculator is fed to a weight adjustment code module 514 which receives the previous weight $W_1$ provided by the search engine to a particular source and adjusts that based on the information dWi from the weight differential calculator. As a result of this continuous process of providing queries to the search sources through the search engine 300 and adjustment of the weights applied to the sources by the search engine, the search engine 300 is configured to choose the most relevant or highest weighted of the sources SE1 to SEn for the particular domain data set.

Once this learning process is complete, the meta search engine can be used in real time to search the various domains, as shown in FIG. 3. The meta search engine recognizes the combination of search terms provided to it as falling within a given data domain and selects the most desirable search sources to interrogate. As pointed out previously, the combination of one set of terms would place the document in one domain resulting in selection of search engines SE2 and SE4 while another set of keywords would place the documents in a different domain where an other set of search engines would be interrogated. In this way, the searcher does not have to ponder what specific search engines are applicable to his search terms. Instead the query router has been programmed to do this job for the searcher by weighting the applicability of each of the sources $SE_1$ to SEn for providing relative information to the search queries from particular domain data sets. When a multi keyword query interrogates the various databases, the query router determines which information domain is most applicable to the set of search terms and then supplies the queries to the dominant search engines. The number of search sources SE1 to SEn to be searched can be selected by the searchers so that instead of two search sources any number can be selected. Alternatively, a weight limit can be placed on the sources so that the number of search sources interrogated will depend on the number being above the weight limit.

The query router can be programmed with the software described in connection with FIGS. 4 to 8 using any properly equipped computer, such as one of the computers 100 in FIG. 1. The software for the query router can then be placed in any of the processors search application service providers 114 or information consolidator 120 shown in FIG. 1. It also can be placed in any personal computer 100 or merchant server 102 where multiple domains are searched.

Above we have described one embodiment of the invention. A number of changes in that embodiment can be made by those skilled in the art. For instance, and without limitation, the software could be made dynamic, that is, as searches are received the product could treat those searches as if they were the set of training queries so that the query router would dynamically adjust to the searches applied. Also, the meta learner could have a self adaptive feature that would have a learning algorithm that would automatically change the scope of the meta learner or one of the base learners to cover queries not properly covered by the query router. In addition, the weight differential calculator can also send the weight adjustment dWi to the query generator 502 to refine the search terms sent to the search engine 300. Therefore it should be understood that while only one embodiment is disclosed, the invention is not limited to that embodiment but encompasses all features covered by the spirit and scope of the appended claims.

What is claimed is:

1. A computer implemented method of optimizing the selection of databases to be interrogated during query searching comprising the steps of:

having a plurality of training sets of documents each characterizing a data domain to be searched;

interrogating the various databases with a plurality of keyword sets generated from each of the training sets of documents;

analyzing documents obtained from the databases by the interrogations to obtain ranking information from those database documents using multiple base learners and a meta learner to rate the applicability of each of the databases to each data domain using the results to weight the databases relative to one another; and enabling the limitation of the interrogations to the most highly rated sources in a given one of the data domains when the search terms fall within that domain.

2. The method of claim 1 providing a result evaluator to analyze results from the documents to generate the ranking information.

3. The method of claim 2 including feeding the ranking information to each of the base learners and having the base learners feed results to the meta learner.

4. The method of claim 1 in which the meta learner provides results from each keyword set to a weight difference calculator to weigh the results of interrogated sources.

5. The method of claim 4 including having the weight difference calculator develop an output for each of the interrogated sources indicating the ranking position of the source relative to the other sources.

6. The method of claim 5 including a reranking algorithm for adjusting the ranking by obtaining the present ranking of a source from the meta search engine and the ranking information provided by the weight difference calculator.

7. The method of claim 6 including having the weight differential information provided to the query generator and having the query generator adjust the queries provided to the search engine based on changes reflected by the weight calculator.

8. A computer-readable program product on a computer usable medium for optimizing the selection of databases to be interrogated during query searching comprising:

software for using a plurality of training sets of documents each characterizing a data domain to be searched;

software for the various databases with a plurality of keyword sets generated from each of the training sets of documents;

software for analyzing documents obtained from the databases by the interrogations to obtain ranking information from those databases documents using multiple base learners and a meta learner to rate the applicability of each of the databases to each data domain using the results to weight the database relative to one another, and software for identifying a data domain based on the search terms of a query and limiting interrogated data sources to the highly rated sources of that domain the most highly rated sources when the search terms fall within the domain.

9. The computer program product of claim 8 providing a result evaluator to analyze results from the documents to generate the ranking information.

10. The computer program product of claim 8 including software for feeding the ranking information to each of the base learners and having the base learners feed results to the meta learner.

11. The computer program product of claim 8 including software for the meta learner provides results from each query to a weight difference calculator.

12. The computer program product of claim 8 including software for the weight difference calculator that develops an output for each of the interrogated sources indicating the ranking position of the source relative to the other sources.

13. The computer program product of claim 8 including software for a reranking algorithm for adjusting tho ranking for data sources by obtaining the present ranking of a source from the meta search engine and the ranking information provided by the weight difference calculator.

14. The computer program product of claim 8 including software for having the weight differential information provided to a query generator and having the query generator adjust the key datasets provided to the search engine based on changes determined by the weight calculator.

* * * * *